US006269132B1

(12) United States Patent
Yonge, III

(10) Patent No.: US 6,269,132 B1
(45) Date of Patent: Jul. 31, 2001

(54) WINDOWING FUNCTION FOR MAINTAINING ORTHOGONALITY OF CHANNELS IN THE RECEPTION OF OFDM SYMBOLS

(75) Inventor: Lawrence W. Yonge, III, Ocala, FL (US)

(73) Assignee: Intellon Corporation, Ocala, FL (US)

( * ) Notice: Subject to any disclaimer, the term of this patent is extended or adjusted under 35 U.S.C. 154(b) by 0 days.

(21) Appl. No.: 09/299,810

(22) Filed: Apr. 26, 1999

(51) Int. Cl.$^7$ .............................. H03D 1/04; H04J 11/00
(52) U.S. Cl. ........................................ 375/346; 370/210
(58) Field of Search .................................. 375/260, 316, 375/285, 346, 340, 354; 370/208, 210

(56) References Cited

U.S. PATENT DOCUMENTS

| 4,057,762 | 11/1977 | Namiki ................................. 329/50 |
| 4,438,511 | 3/1984 | Baran ................................... 370/19 |
| 5,191,576 | 3/1993 | Pommier et al. ..................... 370/18 |
| 5,274,629 | 12/1993 | Helard et al. ........................ 370/50 |

(List continued on next page.)

OTHER PUBLICATIONS

R. Zhang et al., "Windows and interpolatation algorithms for correcting frequency offset in OFDM," Electronics Letters, Oct. 14, 1999, vol. 35, No.21, pp 1868–1869.*
Claus Muschalik et al., "Improving of OFDM Reception using an Adaptive Windowing," IEEE transcation on Consumer Electronics, vol. 42, No. 3, Aug. 1996, pp 259–269.*
Samir Kapoor et al., "Interfrence Suppression in DMT Receiver Using Windowing," Ieee, 2000, pp 778–782.*
Jean Armstrong, "Analysi of New and Existing Methods of Reducing Intercarrier Interference Due to Carrier Frequency Offset in OFDM," IEEE Transaction on Communications, vol. 47, No. 3, Mar. 1999, pp 365–369.*

Synchronization Bursts—Chapter 4, http:\\www.sce.carleton.ca/~Laszlo.Hazy/OFDM/bursts.html (Sep. 23, 1998).
van der Beek et al., "Low–Complex Frame Synchronization in OFDM Systems," Div. of Signal Processing, Lulea Univ. of Technology, S–971 87, Lulea, Sweden (1995).
van der Beek et al., "On Synchronization in OFDM Systems Using the Cyclic Prefix," Div. of Signal Processing, Lulea Univ. of Technology, S–971 87, Lulea Sweden (no date).
Cioffi et al., "Very–High–Speed Digital Subscriber Lines", IEEE Communications Magazine, vol. 37, No. 4, pp. 72–79 (Apr. 1999).
Armstrong, "Analysis of New and Existing Methods . . . in OFDM," IEEE Transactions On Communications, vol. 47, No. 3, pp. 365–369 (Mar. 1999).
Edfors et al., "An introduction to orthogonal frequency–division multiplexing," (Sep. 1996).
Sandell et al., "Timing and Frequency Synchronization in OFDM Systems Using the Cyclic Prefix," Div. of Signal Processing, Lulea Univ. of Tech., S–971 87, Lulea, Sweden (no date).
Schmidl et al., "Robust Frequency and Timing Synchronization for OFDM," IEEE Trans. on Communication, vol. 45, No. 12, pp. 1613–1621 (Dec. 1997).

*Primary Examiner*—Tesfaldet Bocure
(74) *Attorney, Agent, or Firm*—Fish & Richardson P.C.

(57) ABSTRACT

A windowing mechanism for processing an OFDM symbol is presented. The windowing mechanism applies an apodizing window function having the property $W_j + W_{(FFTSize/2 + j)}$ =constant, where FFTSize is the size of the FFT sample, to a received OFDM symbol sample and a time-offset version of the OFDM symbol sample to produce sets of windowed values. The time-offset sample is offset from the original symbol by one half the symbol period. The time-offset windowed sample is shifted into realignment with the windowed original symbol. Corresponding ones of the windowed values are summed together to restore the windowed symbol to its original form.

18 Claims, 19 Drawing Sheets

U.S. PATENT DOCUMENTS

| | | | |
|---|---|---|---|
| 5,282,222 | 1/1994 | Fattouche et al. | 375/1 |
| 5,357,502 | 10/1994 | Castelain et al. | 370/19 |
| 5,416,767 | 5/1995 | Koppelaar et al. | 370/23 |
| 5,444,697 | 8/1995 | Leung et al. | 370/19 |
| 5,450,456 * | 9/1995 | Mueller | 375/343 |
| 5,452,015 | 9/1995 | Hulyalkar | 348/608 |
| 5,471,464 | 11/1995 | Ikeda | 370/19 |
| 5,488,632 | 1/1996 | Mason et al. | 375/260 |
| 5,506,836 | 4/1996 | Ikeda et al. | 370/19 |
| 5,528,581 | 6/1996 | De Bot | 370/19 |
| 5,546,429 | 8/1996 | Chiasson et al. | 375/341 |
| 5,548,582 | 8/1996 | Brajal et al. | 370/18 |
| 5,550,812 * | 8/1996 | Philips | 370/208 |
| 5,555,268 | 9/1996 | Fattouche et al. | 375/206 |
| 5,559,833 | 9/1996 | Hayet | 375/259 |
| 5,596,582 | 1/1997 | Sato et al. | 370/509 |
| 5,596,604 | 1/1997 | Cioffi et al. | 345/260 |
| 5,602,835 | 2/1997 | Seki et al. | 370/206 |
| 5,608,764 | 3/1997 | Sugita et al. | 375/344 |
| 5,610,908 | 3/1997 | Shelswell et al. | 370/210 |
| 5,627,863 | 5/1997 | Aslanis et al. | 375/357 |
| 5,633,896 * | 5/1997 | Carlin et al. | 375/340 |
| 5,636,224 | 6/1997 | Voith et al. | 371/2.1 |
| 5,652,772 | 7/1997 | Isaksson et al. | 375/367 |
| 5,682,376 | 10/1997 | Hayashino et al. | 370/206 |
| 5,694,389 | 12/1997 | Seki et al. | 370/208 |
| 5,726,973 | 3/1998 | Isaksson | 370/203 |
| 5,732,113 | 3/1998 | Schmidl et al. | 375/355 |
| 5,774,450 | 6/1998 | Harada et al. | 370/206 |
| 5,790,516 | 8/1998 | Gudmundson et al. | 370/210 |
| 5,799,033 | 8/1998 | Baggen | 370/200 |
| 5,802,117 | 9/1998 | Ghosh | 375/344 |
| 5,812,523 | 9/1998 | Isaksson et al. | 370/208 |
| 5,886,749 | 3/1999 | Williams et al. | 348/614 |
| 5,889,759 | 3/1999 | McGibney | 370/207 |
| 5,901,180 | 5/1999 | Aslanis et al. | 375/261 |
| 5,914,931 | 6/1999 | Kang et al. | 370/203 |
| 6,074,086 * | 6/2000 | Yonge, III | 375/343 |

* cited by examiner

WINDOWING FUNCTION FOR MAINTAINING ORTHOGONALITY OF CHANNELS IN THE RECEPTION OF OFDM SYMBOLS

BACKGROUND OF THE INVENTION

The invention relates generally to broadband transmission of information. More specifically, the invention relates to improving data transfer over OFDM channels in the presence of narrowband noise.

Orthogonal Frequency Division Multiplexing (OFDM) is a spread spectrum technology wherein the available bandwidth is subdivided into a number of discrete channels or subcarriers that are overlapping and orthogonal to each other. Each channel has a well defined frequency. Data are transmitted in the form of symbols that have a predetermined duration and encompass some number of subcarrier frequencies. The data transmitted over these channels can be encoded in amplitude and/or phase, using conventional encoding schemes such as Binary Phase Shift Key (BPDK), Quadrature Phase Shift Key (QPSK), m-bit Quadrature Amplitude Modulation (m-QAM).

The OFDM channels frequently experience noise interference from interference sources which can effect both the amplitude and the phase of the subcarriers. Such noise can arise from two sources: random noise wherein the noise energy is randomly distributed in both time and frequency domain; and narrowband noise generated, for example, by a jammer emitting a narrowband signal at one or several frequencies that are localized within the frequency range of the OFDM channels. At the receiver, the data have to be separated from the noise. The receiver typically performs a Fourier transform on the received temporal symbol to recover from the temporal symbol waveform the phase and amplitude of each OFDM channel. The Fourier transform is performed over a finite time interval, e.g., the symbol time $T_s$. If a temporal waveform is not strictly periodic during the finite time interval, e.g., due to random noise or narrowband noise, artifacts are introduced in the Fourier-transformed signal. These artifacts may make it more difficult to recover the originally transmitted data.

As is known in the art, processing a noise-distorted temporal waveform with an apodizing window function (e.g., a Hanning window) confines interference from narrowband noise to a relatively small number of OFDM channels. That is, the window prevents the noise signal from spreading substantially to channels beyond the channels closest to that signal. However, the apodizing function itself introduces interchannel interference (ICI), which degrades the orthogonal characteristics of the OFDM channels. Thus, even in the absence of random or narrowband noise, the ICI generated by an apodizing function causes each OFDM channel to "leak" some amount of energy into nearby adjacent channels. In the case of a Hanning window, each of the OFDM channels contain 50% of the original signal and 25% of the signal from each of the adjacent channels.

Related copending U.S. application Ser. No. 09/255,164, in the name of Lawrence W. Yonge III, describes transmitting data only over non-adjacent subcarriers instead of over each one of the subcarriers processed with a Hanning window (or other apodizing window). With this technique, the components of adjacent carriers are removed from each of the transmitted carriers. While this technique eliminates ICI between OFDM channels, it does so at the expense of performance as only half of the available channel bandwidth is utilized.

SUMMARY OF THE INVENTION

In one aspect of the invention, a method of processing an OFDM symbol performs a windowing function on a symbol sample having a symbol period of T and a time-offset symbol sample offset from the symbol sample by T/2 to produce first windowed values for the symbol sample and second windowed values for the time-offset symbol sample. The method further includes applying a time shift to re-align the time-offset symbol sample with the symbol sample and therefore re-align the second windowed values with corresponding first windowed values. Once the time-offset symbol sample is re-aligned with the symbol sample, the method adds the second windowed values to the corresponding first windowed values. The performed windowing function is a "symmetric" apodizing window function W, which is defined as an apodizing window function having the property $W_f + W_{(FFTSize/2+f)}$=constant, where FFTSize is the size of the FFT sample.

Embodiments of the invention may include one or more of the follwing features.

The symmetric apodizing window function may be performed in the time domain.

The symmetric apodizing window function may be performed in the frequency domain and may be applied to FFT frequency coefficients of the symbol sample and the time-offset symbol sample.

The symmetric apodizing window function may be a Hanning window.

The 1.5*T sample and windowing scheme of the invention offers several advantages. In the frequency domain, the windowing scheme eliminates the effects of a symmetric apodizing window (e.g., Hanning window) on adjacent carriers. Consequently, such an apodizing window may be used to reduce jammer-related signal degradation, i.e., limiting the effect of a non-orthogonal narrowband interferer by tapering the endpoints of a signal smoothly to zero, without introducing added distortion into the OFDM receiver. In the time domain, the windowing scheme, the realignment and combination of the signals restores the original signal without changing the benefit gain (reduction in effects of narrowband interferer) achieved by applying the window. In addition to improved jammer performance, the technique may result in an improved S/N ratio (of approximately 0.6 dB) because it takes a longer sample and, while the two instances of the signal add coherently, the noise does not.

DETAILED DESCRIPTION

In OFDM transmission, data are transmitted in the form of symbols. Each symbol has a predetermined time duration or symbol time $T_s$. Each symbol is comprised of N sinusoidal waveforms that are orthogonal to each other and form the OFDM channels and subcarriers. Each subcarrier has a frequency $F_i$ and a phase $\phi_i$ measured from the beginning of the symbol. Orthogonality of the subcarriers requires that a whole number of periods of each waveform are contained within the symbol time $T_s$. The phases $\phi_i$ and amplitude $A_i$ of the waveforms can be set arbitrarily without affecting the orthogonality of the waveforms. The OFDM subcarriers occupy a frequency range between frequencies $f_1$ and $f_N$, referred to as OFDM bandwidth. Each subcarrier frequency $f_i$ has a uniform frequency spacing $\Delta f$ from the adjacent subcarrier frequency $f_{i\pm1}$. The $\Delta f$ is inversely proportional to the symbol time $T_s$.

Typically, and as is well known in the art, intersymbol and intercarrier interference in transmitted OFDM symbols is mitigated by using a cyclic prefix. The cyclic prefix, which is prepended to a transmitted OFDM symbol, is a copy of the last part of the OFDM symbol. Thus, a symbol with a cyclic prefix remains periodic.

Figure 1:
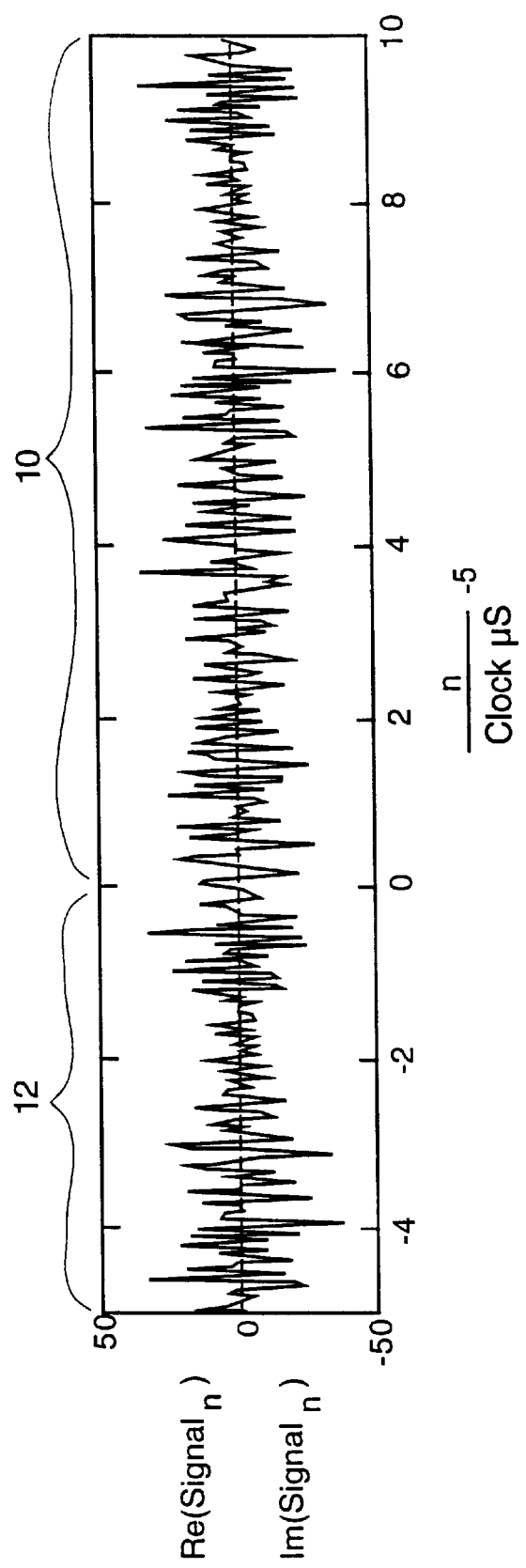
FIG. 1 is a temporal OFDM symbol having a cyclic prefix.
Figure 2:
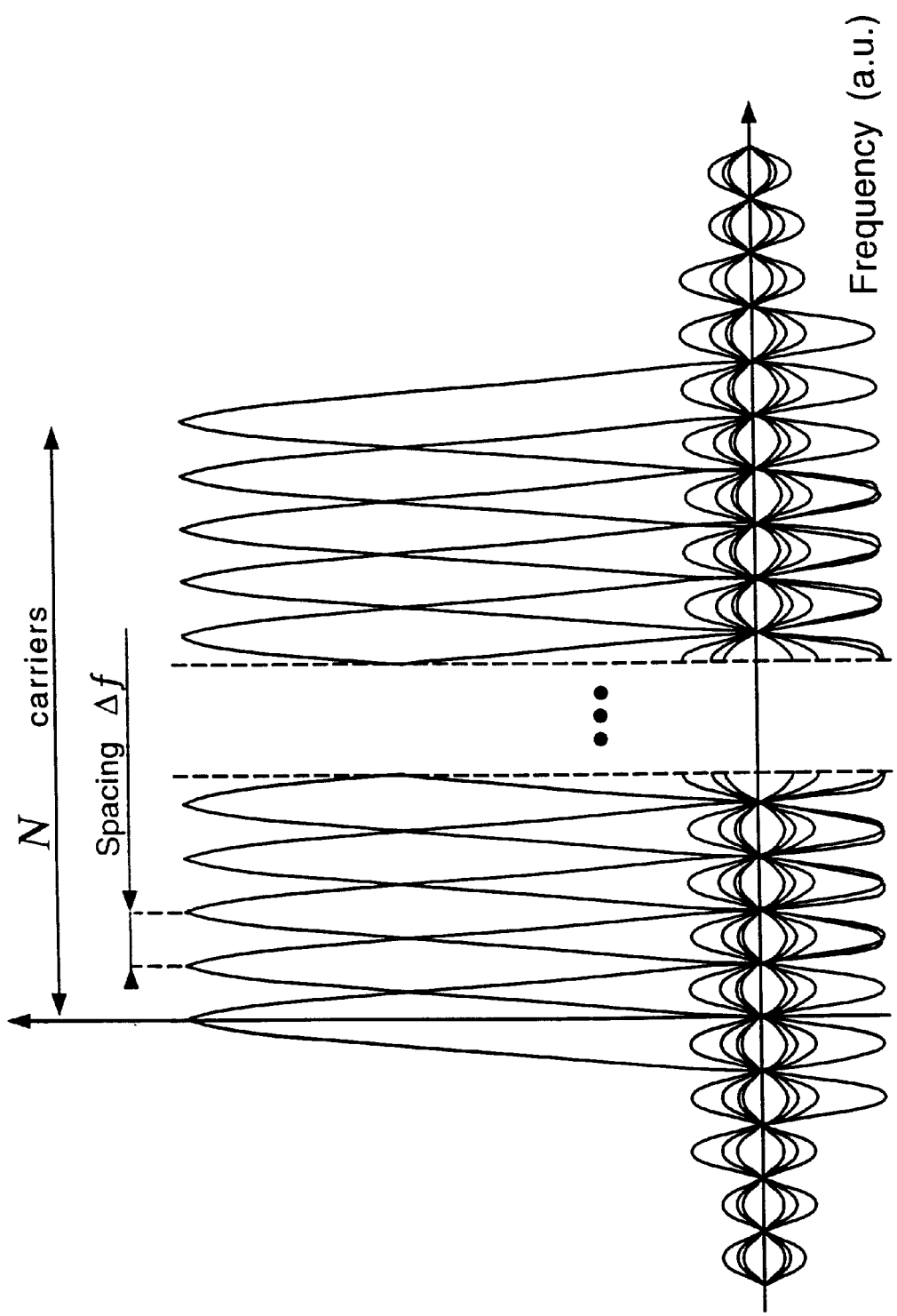
FIG. 2 illustrates symbolically a frequency distribution of the OFDM symbol.

Referring to FIGS. 1 and 2, an exemplary OFDM symbol 10 has a symbol time $T_s$ of 10 μs, which produces a channel spacing $\Delta f=1/10$ μs=100 kHz. The symbol includes 84 subcarriers, subcarriers 23 through 106. In the example of FIG. 1, the symbol is a QPSK-modulated symbol with random phases and constant amplitudes. However, any other set of phases and amplitudes may be selected. For the purpose of digital signal processing, the symbol is sampled during the symbol time $T_s$ at 256 sample points at a clock rate of 25.6 MHz.

As illustrated in FIG. 1, the symbol 10 has a cycle prefix 12. The cycle prefix is shown to be 5 μs in duration.

Figure 3:
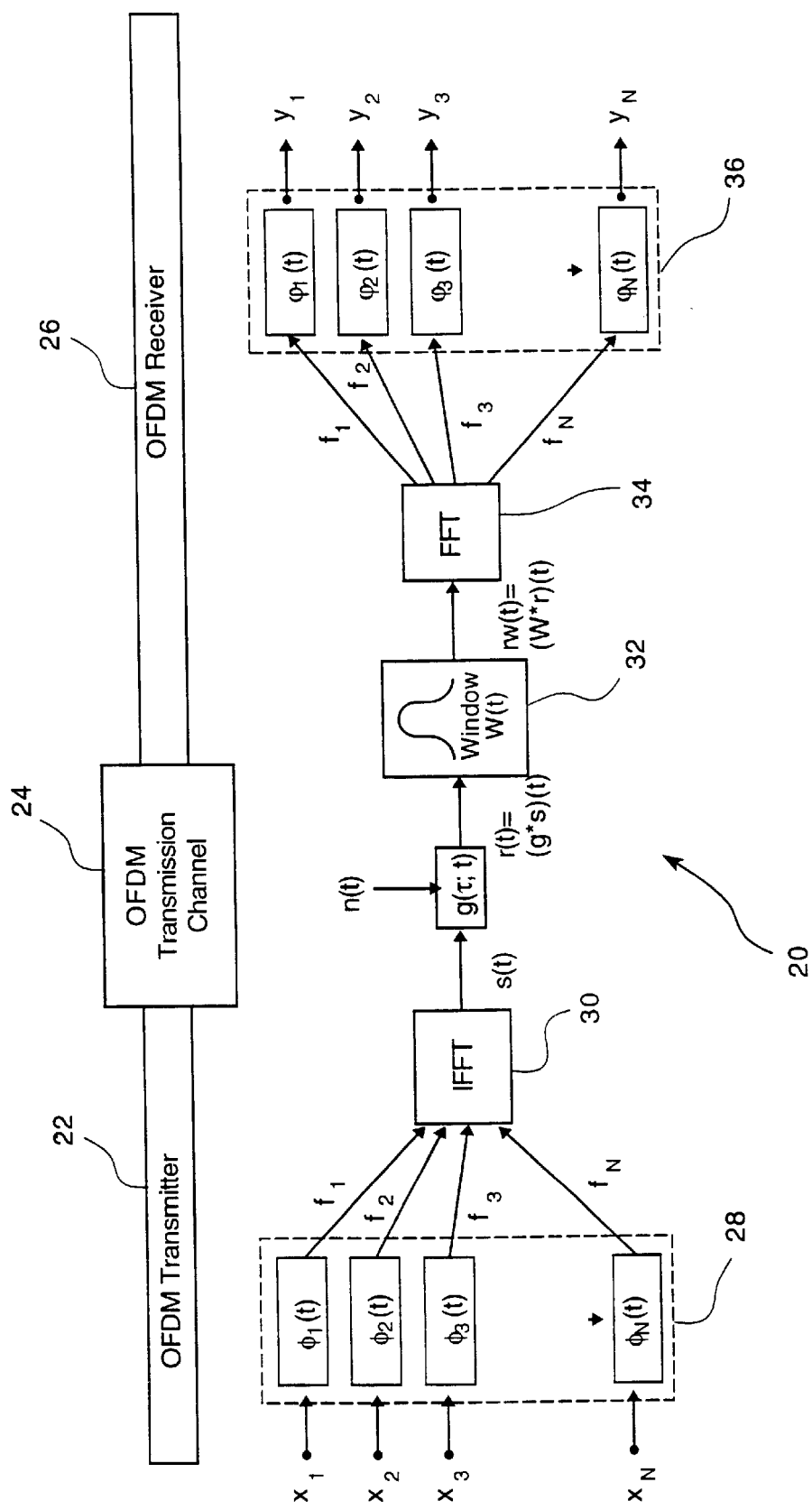
FIG. 3 is a schematic diagram of an OFDM transmission system.

Referring to FIG. 3, an exemplary prior art OFDM transmission system 20 is shown. The OFDM system 20 includes an OFDM transmitter 22, an OFDM transmission network 24, and an OFDM receiver 26. An encoder 28 encodes a set of points $\{X_1, \ldots, X_N\}$, which are generally complex numbers, as phases and/or amplitudes of the N orthogonal OFDM subcarriers having frequencies $f_1, \ldots, f_N$. The encoded subcarriers are transformed in inverse Fourier transform module 30 to form a temporal waveform S(t), which can be written as $$S(t) = \sum_{i=1}^{N} A_i \cos(2\pi f_i t + \Phi_i) \qquad \text{Eq. (1)}$$

where $A_i$ is the amplitude and $\phi_i$ is the phase of the subcarrier at frequency $f_i$.

The temporal waveform S(t) is transmitted via transmission network 24 which is characterized by a transmission function g(τ;t) representing an impulse response of the OFDM transmission channel. The OFDM transmission network may add noise r(t), which may be random noise and/or narrowband noise emitted by a jammer.

The receiver 26 includes a window filter 32 and an FFT module 34. The window filter 32 applies a window function, the width of which is the same as the symbol time $T_s$. The FFT module 34 transforms the signal it receives as input into the frequency domain. In the arrangement shown in the figure, the window filter 32 is placed before the FFT module 34 and multiplies the received waveform r(t)=(g*s)(t) with a window function W(t), forming temporal signal rw(t) windowed temporal signal rw(t). Alternatively, the window filter 32 may be arranged after the FFT module 34. In the alternative arrangement, the FFT module first transforms the signal r(t) into the frequency domain and the multiplication rw(t)=W(t)*r(t) in the time domain is therefore replaced by a convolution. The window amplitude in the frequency domain, for the case of a Hanning window, is obtained by subtracting for each subcarrier $f_i$ one half of the sum of the amplitudes at the adjacent carriers, i.e., $1/2(f_{i-1}+f_{i+1})$. A demodulator 36 receives the amplitudes and phases of the subcarrier waveforms $\psi_i(t)$ which represent the data $\{y_1, \ldots, y_N\}$.

It is assumed that the pre-demodulation processing performed by the receiver 26 on received symbols occurs after synchronization. Synchronization may be performed using techniques described in a related U.S. application entitled "Synchronization of OFDM Signals With Improved Windowing" and copending U.S. application Ser. No. 09/234,289, both in the name of Lawrence W. Yonge III, as well as other techniques known in the art.

Figure 4:
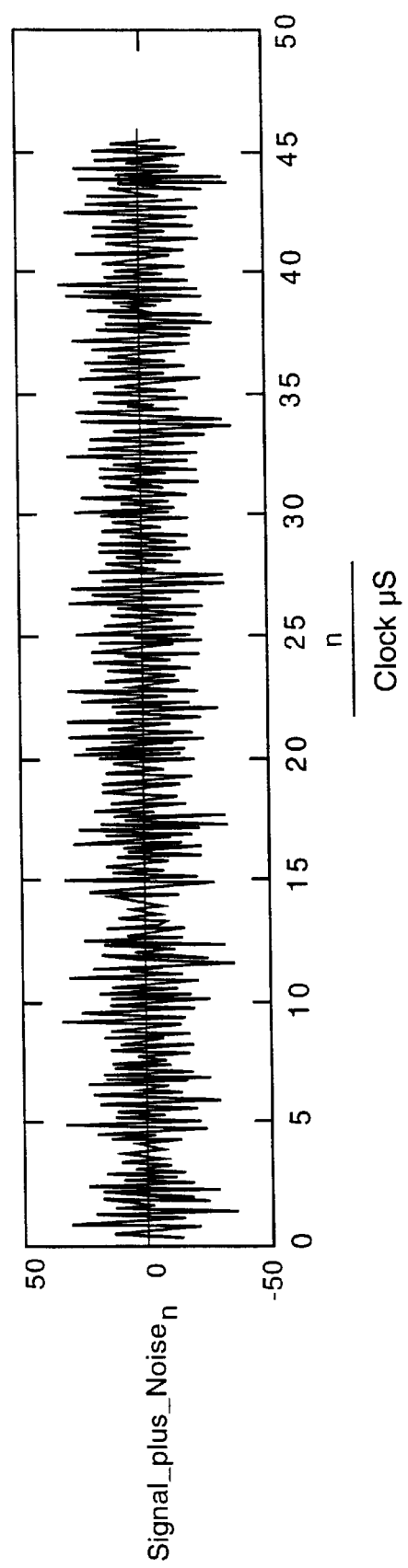
FIG. 4 is a sequence of OFDM symbols that have cyclic prefixes.

Referring now to FIG. 4, an exemplary temporal signal waveform 40 is composed of three consecutive OFDM symbols, the first of the three corresponding to the symbol 10 shown in FIG. 1, and each having a duration of $T_s$=10 μs. As can be seen in the figure, each of the three symbols has a 5.0 μs cyclic prefix.

Figure 5:
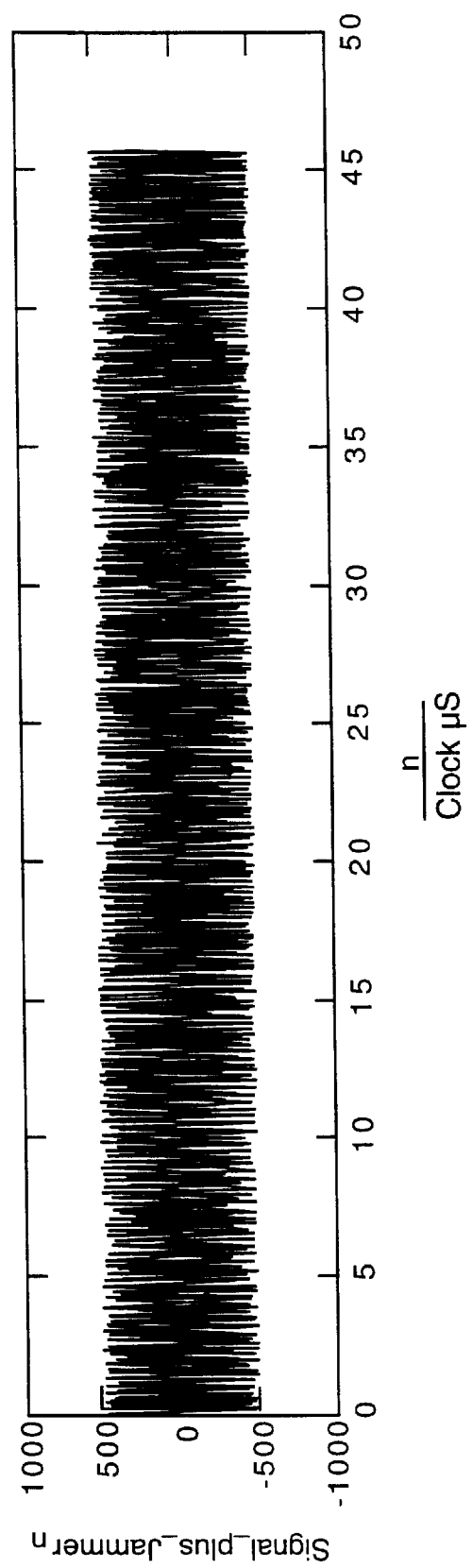
FIG. 5 is the sequence of OFDM symbols of FIG. 4 with superimposed narrowband noise from a jammer.

Referring now to FIG. 5, the signal of an exemplary jammer emitting a strong interfering signal at a single frequency is added to the temporal waveform 40 of FIG. 4, producing the waveform 50. In the example, the jammer-to-signal ratio is 31.7 dB, i.e., the jammer amplitude is 500 times stronger than the signal amplitude in each of the 84 OFDM channels. As seen in FIG. 5, the jammer completely masks the OFDM symbols of the temporal waveform 30.

In an ideal OFDM network, symbols include only the orthogonal OFDM frequencies. If these ideal symbols are sampled with a rectangular window R(t) having a width equal to the symbol time $T_s$, then the received symbol decoded with the rectangular window by the OFDM receiver 26 reproduces the originally transmitted data, i.e., $y_i=x_i$ for all channels. The received symbol, however, may include additional frequency components, such as a jammer signal. These additional frequency components are unlikely to coincide exactly with one of the orthogonal OFDM frequencies $f_i$ and are therefore not orthogonal to the other OFDM channels. The non-orthogonality introduces crosstalk between channels, generally referred to as interchannel interference (ICI).

Figure 6:
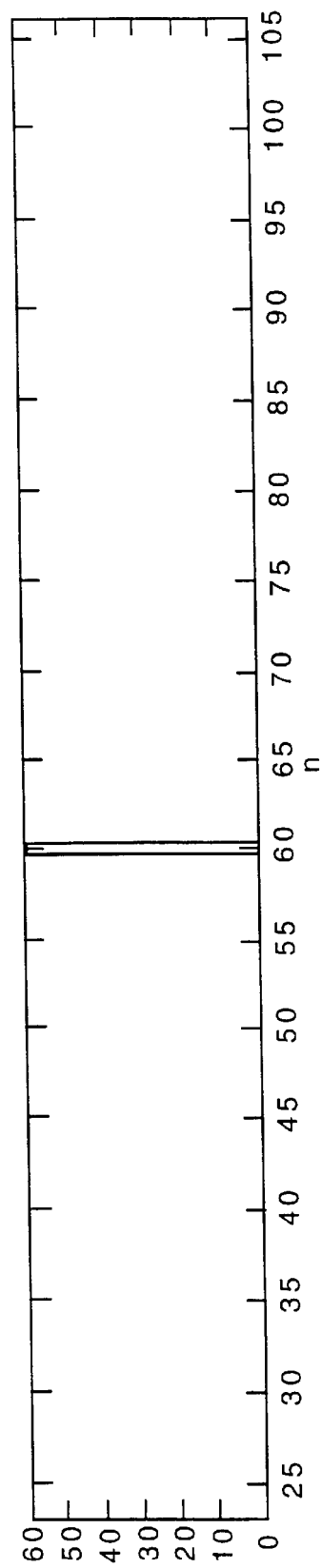
FIG. 6 illustrates a jammer signal coinciding in frequency with an OFDM channel frequency and processed with a rectangular window.

Referring now to FIG. 6, a jammer emits a strong signal at a frequency identical to the frequency of channel 60. The received signal is processed or filtered with a rectangular window R(t). Because the jammer in this example is orthogonal to the OFDM subcarrier frequencies $f_i$, the jammer signal is confined to channel 60 and does not spread to the remaining OFDM channels. Data transmitted over the remaining channels are undisturbed by the jammer, and the OFDM network is fully usable by, for example, excluding channel 60 from data transmission.

Figure 7:
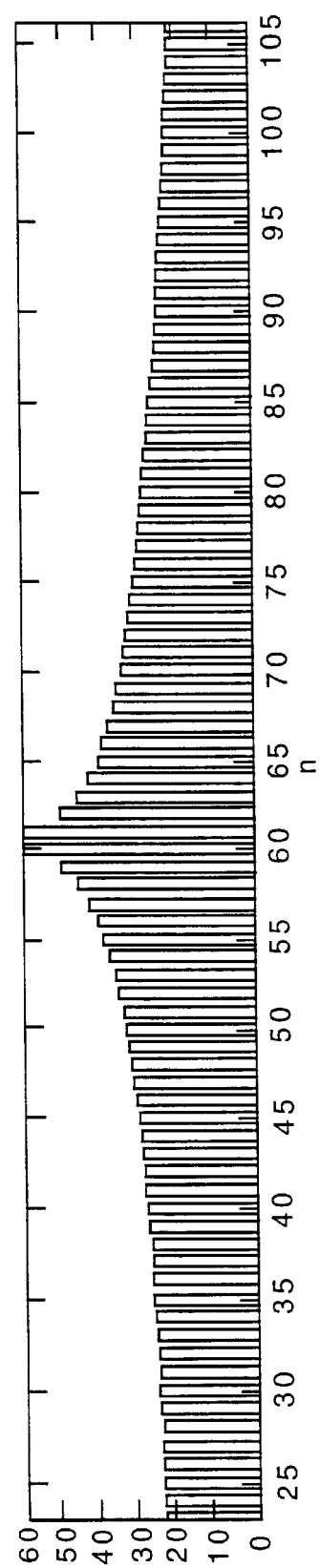
FIG. 7 illustrates a jammer signal differing in frequency from an OFDM channel frequency and processed with a rectangular window.

Referring now to FIG. 7, the jammer frequency shown here is not identical to an OFDM subcarrier frequency. In fact, FIG. 7 illustrates the worst case where the jammer frequency is located halfway between two OFDM channels, e.g., between channel 60 and 61. In this example, the jammer essentially impacts all OFDM channels, making data transmission over the OFDM network virtually impossible. The situation illustrated in FIG. 7 is most likely to occur in practical applications.

Figure 8:
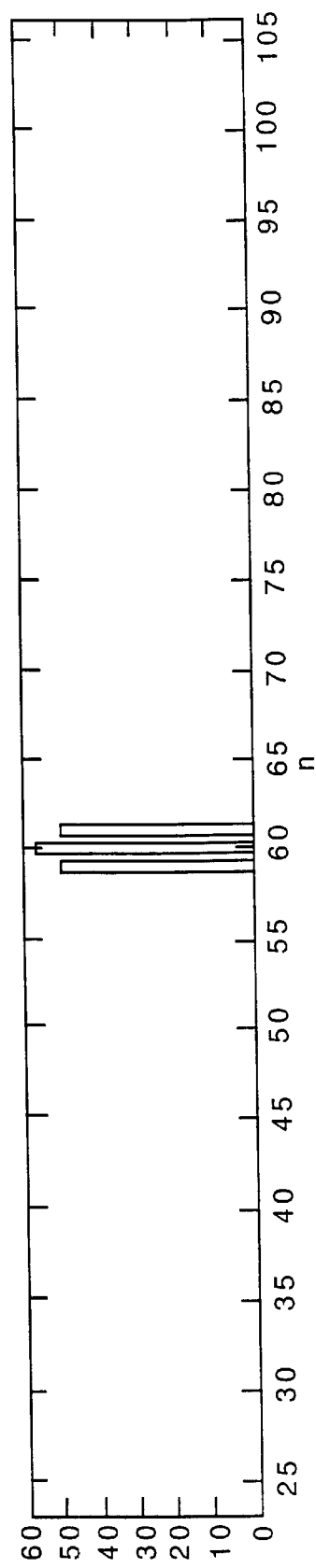
FIG. 8 illustrates the jammer signal of FIG. 6 processed with a Hanning window.

Referring now to FIG. 8, the jammer of FIG. 6 is filtered with a Hanning window H(t). Although the jammer frequency is orthogonal to the OFDM channels, the jammer signal spreads to the two adjacent channels. The jammer has a negligible effect on the other OFDM channels. A comparison between FIG. 6 and FIG. 8 suggests that the Hanning window degrades the performance of the OFDM network if the jammer frequency coincides with the frequency of an OFDM channel. The Hanning window H(t), however, provides a significant improvement over a rectangular window R(t) when the jammer frequency is different from the frequency of an OFDM channel.

Figure 9:
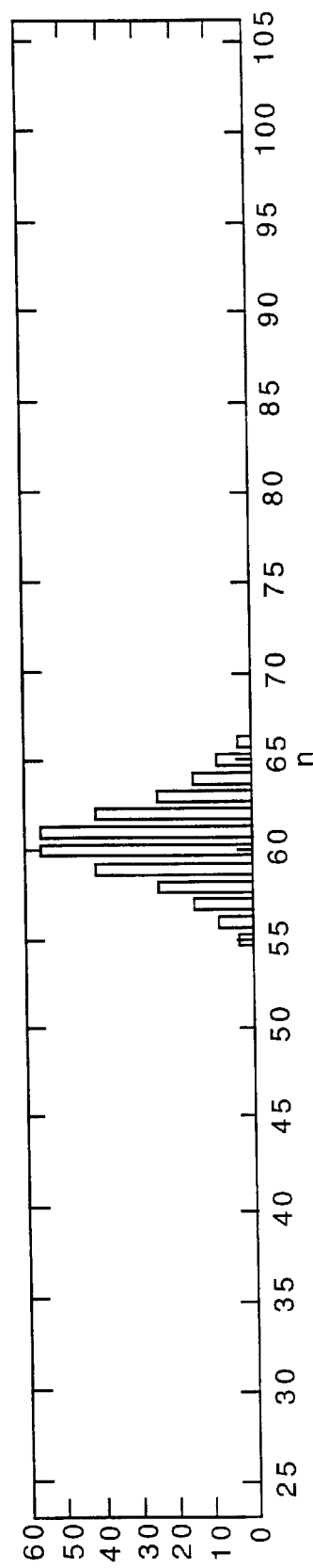
FIG. 9 illustrates a jammer signal of FIG. 7 with a Hanning window.

Referring to FIG. 9, the jammer of FIG. 7, with a frequency halfway between OFDM channels 60 and 61, is filtered with a Hanning window H(t). As seen in FIG. 9, the jammer signal may impair approximately 5 OFDM channels on either side of the jammer frequency. A total of 10 channels may have to be excluded from data transmission, while the remaining OFDM channels are unaffected by the jammer. In other words, processing the received signal waveform with a Hanning window confines interference from the jammer to a relatively small number of OFDM channels.

The Hanning window provides the advantage of preventing the jammer's signal from spreading substantially to channels beyond the channels closest to the jammer. However, the Hanning window, like any other apodizing function, introduces interchannel interference (ICI), which degrades the orthogonal characteristics of the OFDM channels. Even in the absence of random or narrowband noise, ICI causes each OFDM channel to "leak" some portion of the originally received signal amplitude into each of the respective adjacent channels.

Figure 10:
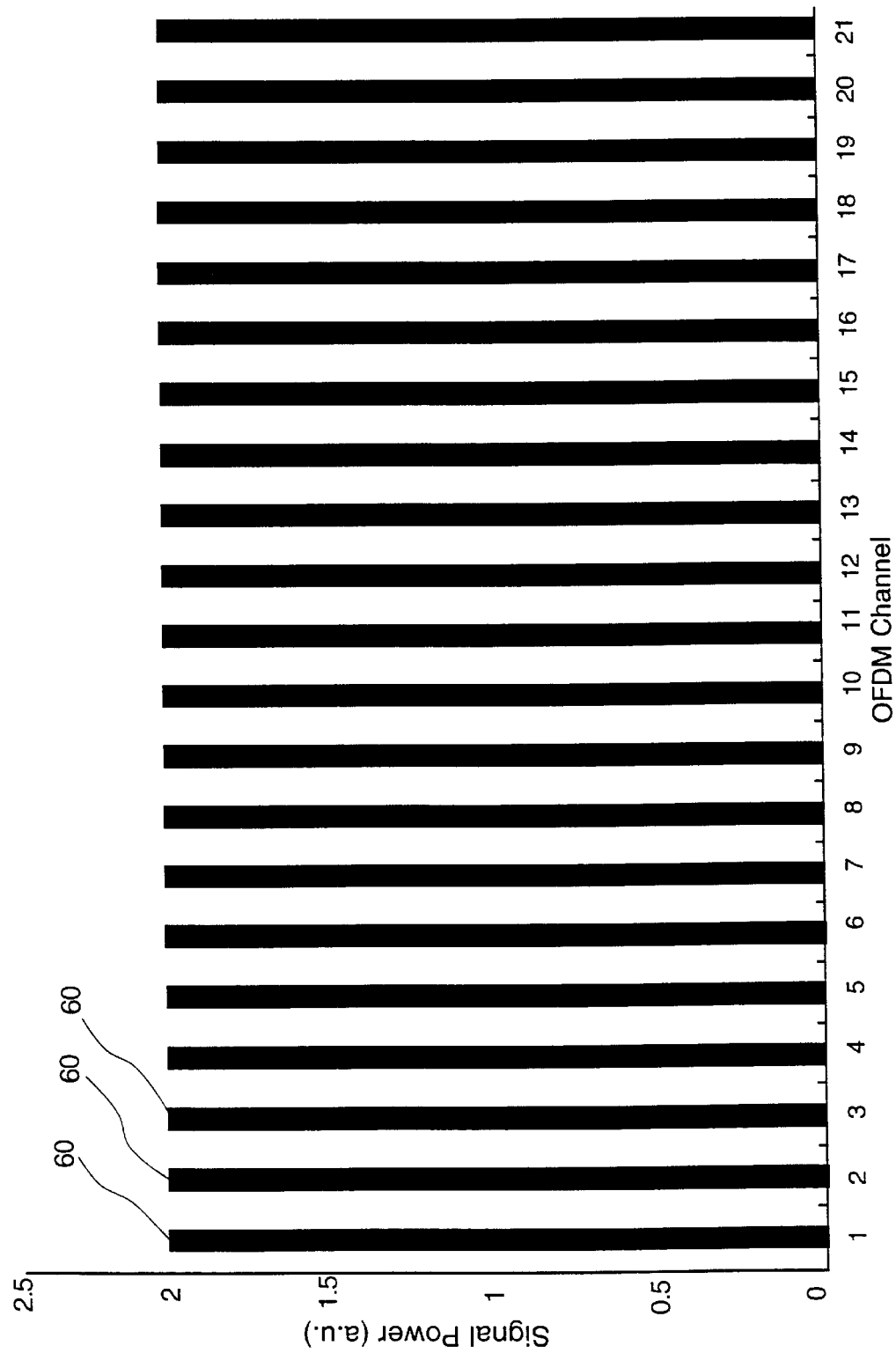
FIG. 10 illustrates the signal amplitude of the subcarriers without interchannel interference.
Figure 11:
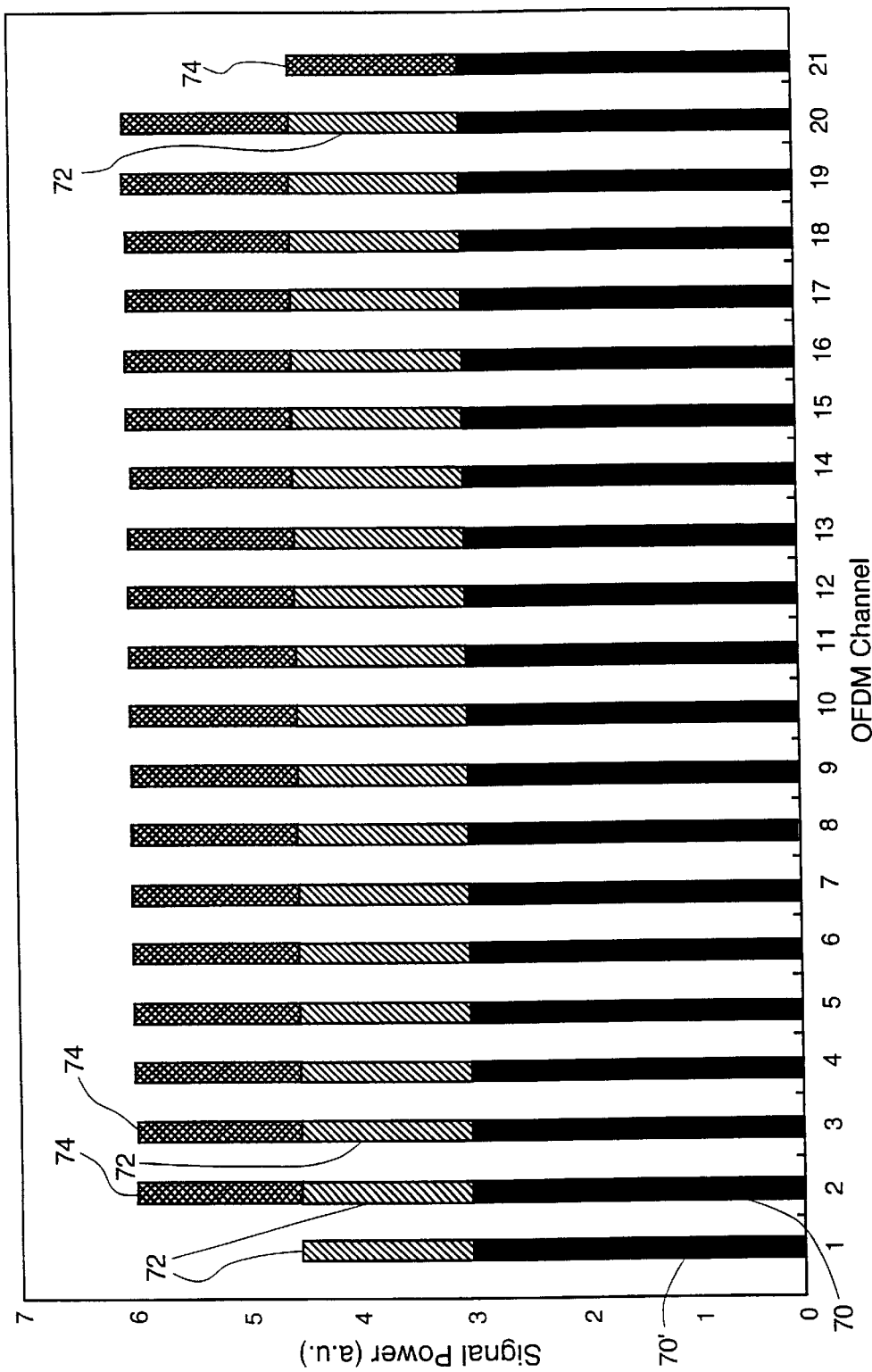
FIG. 11 illustrates the signal of the subcarriers of FIG. 10 processed with a Hanning window.

Referring now to FIGS. 10 and 11, an exemplary OFDM network transmits data over OFDM channels 60 with identical signal power (FIG. 10). As discussed above, a rectangular window R(t) in the receiver 1130 reproduces the transmitted data set $\{x_1, \ldots, x_N\}$ so that $y_i = x_i$ for all channels. A Hanning window, on the other hand, transfer approximately 25% of the transmitted signal 60 to the preceding channel 72 and the following channel 70. Approximately 50% of the transmitted signal 60 remains in the original channel 70. In other words, after the Hanning window, each of the OFDM channels contain 50% of the original signal 70 and 25% of the signal from each of the neighboring channels 72, 74. The decoded data $\{y_1, \ldots, y_N\}$ therefore are no longer identical to the data set $\{x_1, \ldots, x_N\}$ originally transmitted.

Figure 12:
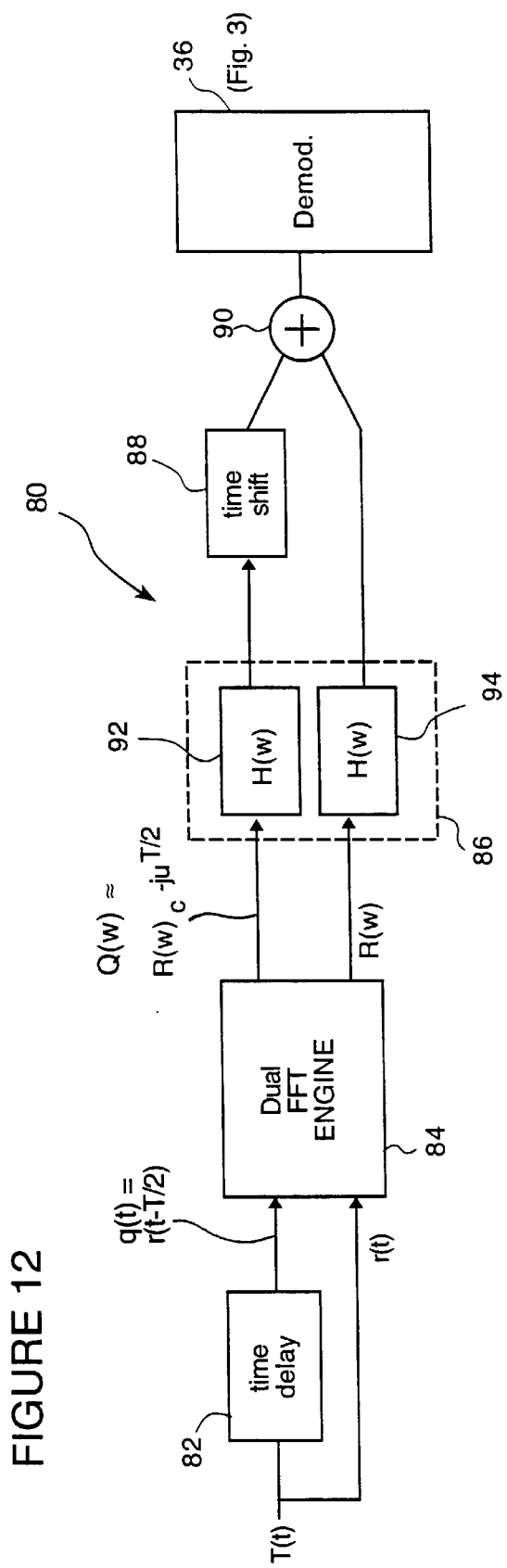
FIG. 12 is a block diagram of an OFDM receiver.

Referring to FIG. 12, an OFDM receiver 80 for receiving OFDM symbols over OFDM channel 24 (FIG. 3) is shown. The receiver 80 includes a time delay or offset element 82, a "dual" FFT engine 84, a window filter 86, a time shift element 88 and a summation unit (or "adder") 90. The output of the adder 90 is connected to the demodulator 36 (of FIG. 3). The window filter includes a first Hanning window function 92 and a second Hanning window function 94, as will be described later. The dual FFT module receives a sample of the original signal r(t) and a time-offset sample $r(t-t_o)$ offset by $t_o = T/2$. The dual FFT engine transforms the time-offset sample into a first set of time-offset frequency coefficients $R(\omega)*e^{-j\omega t_o}$ and transforms the original sample, that is, the non-offset sample, into a second set of frequency coefficients $R(\omega)$. The frequency coefficients are processed by the window filter 86, which is selected as a "symmetric" apodizing window function W. The symmetic apodizing window function is defined herein as an apodizing window function having the property $W_j + W_{(FFTSize/2+j)} = $ constant, where "FFTSize" is the size of the FFT sample. In the illustrated embodiment, the symmetric apodizing window (window filter 86) is the Hanning window, for which all values of j add up to one and thus has the aforementioned property. As shown in the figure, the time-offset coefficients are processed by the first Hanning window 92, and the non-offset coefficients are processed by the second Hanning window 94. The time-offset frequency coefficients are shifted to realign them with the corresponding frequency coefficients. The time-shift re-alignment is achieved by multiplying all odd ones of the time-offset coefficients by −1, as will be described. The time-offset, now realigned frequency coefficients are added to their corresponding frequency coefficients output by the second Hanning window and the resultant values are provided to the demodulator 36.

Figure 13:
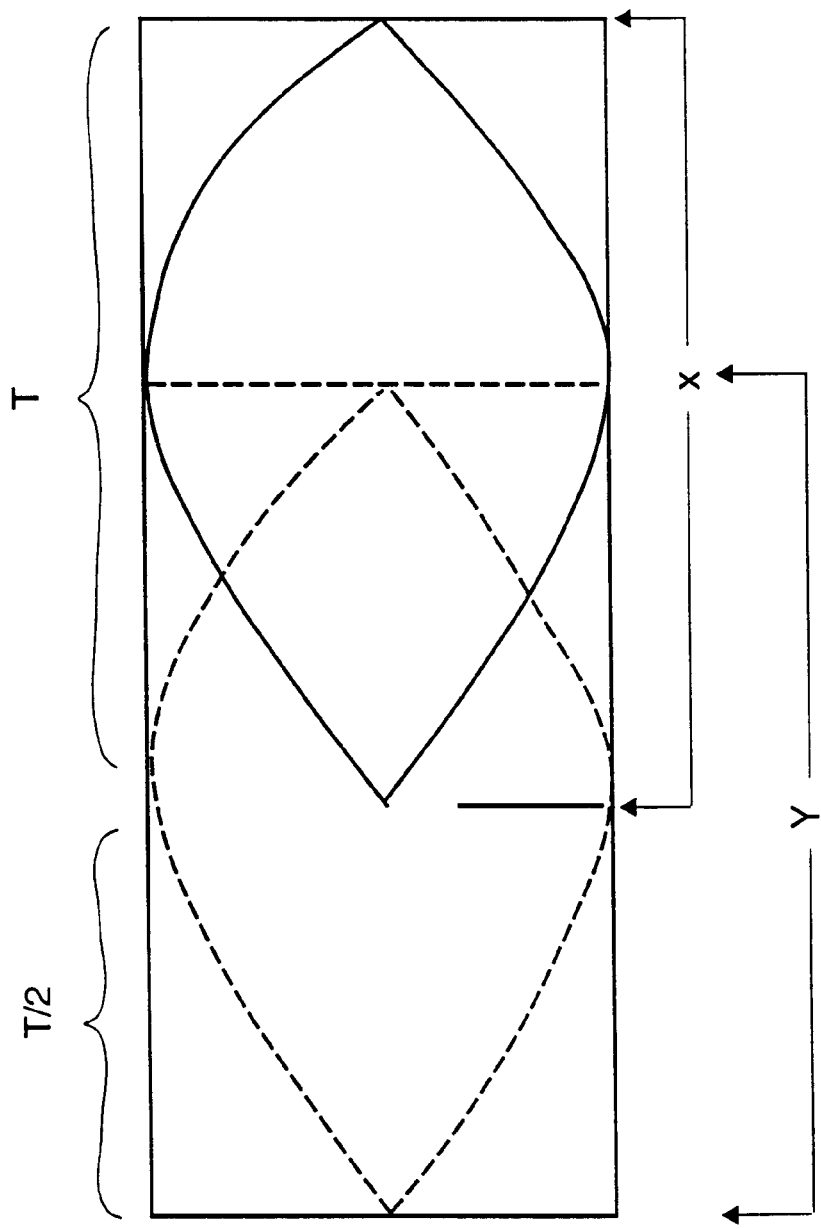
FIG. 13 is a depiction of a Hanning window applied to a symbol sample and the symbol sample offset by T/2 in the frequency domain.

Referring now to FIG. 13, a depiction of sample and a time-offset sample windowed in the frequency domain is shown. The windowed sample X (of a symbol having a symbol period T) is the convolution of the sample and the Hanning window function. Likewise, the windowed time-offset sample Y (offset by T/2) is the convolution of the time-offset sample and the Hanning window function.

Because a cyclic prefix is a time-offset copy of a portion of the symbol to which it is prepended, it is desirable to simply extend the existing cyclic prefix to provide the overall window size of 1.5 T (i.e., T sample plus T/2 offset). If, for example, the cyclic prefix is only 50 points long, an additional extention of 128 points would be needed to satisfy the above technique.

Figure 14:
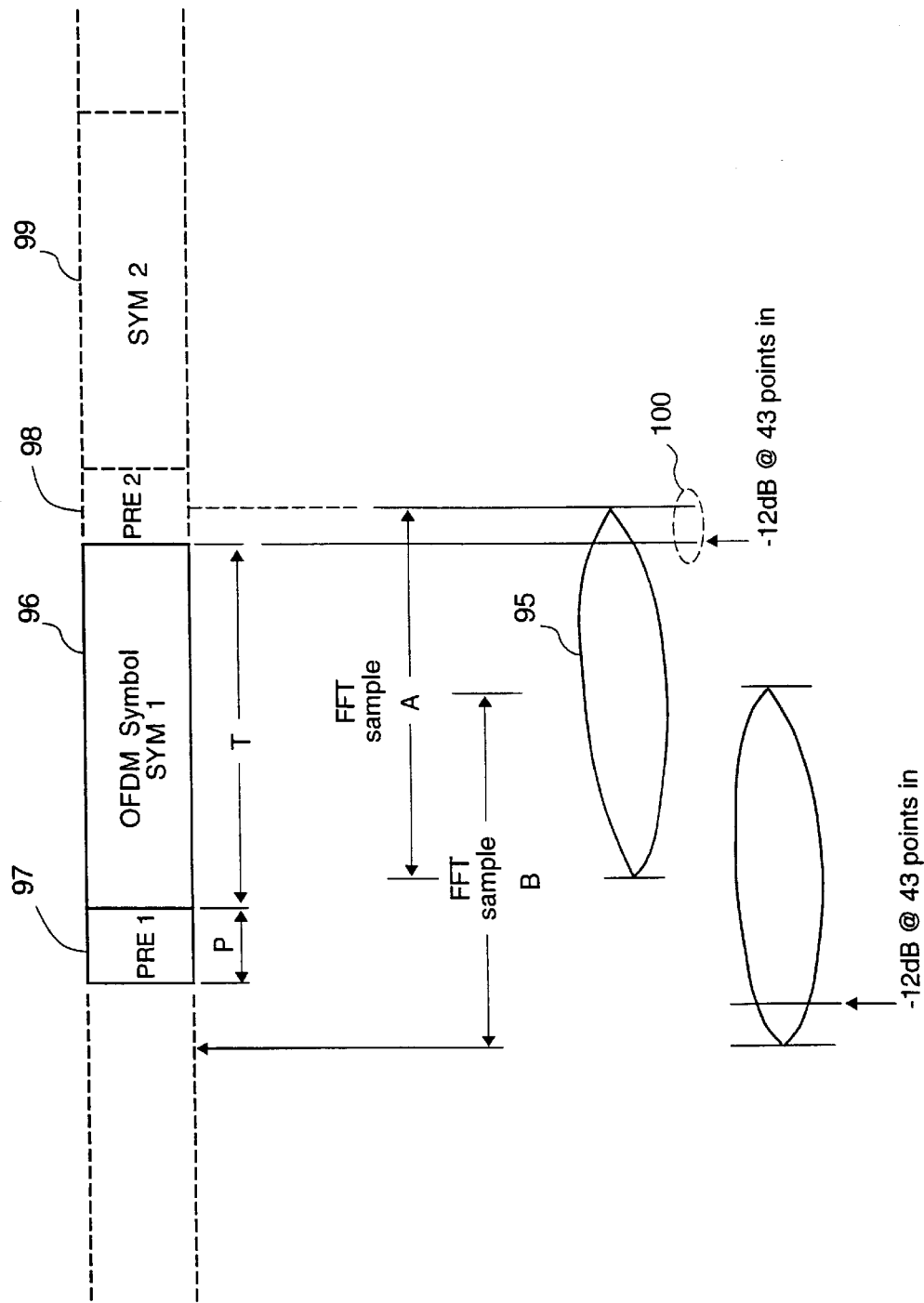
FIG. 14 is an illustration of a Hanning window applied to a symbol sample having a cyclic prefix and the symbol sample offset by T/2 in the frequency domain.

Alternatively, and as demonstrated in the windowing depiction of FIG. 14, an original sample 95 ("A") corresponding to a symbol 96 ("SYM1") having a cyclic prefix 97 ("PRE1") may be taken to include some portion of a cyclic prefix 98("PRE2") of the following symbol 99 ("SYM2"). That is, the sample 95 may be offset by an attenuation threshold amount 99 above which the windowing has minimal effect on the spectrum of the sample. In the example shown, the attenuation threshold amount 100 is 12 dB, which corresponds to windowing point 43. The offset provides for a reduction in the added size of the cyclic prefix 97.

If a desired cyclic prefix size is T/2 points and the impulse response of the channel is 50 points, then the cyclic prefix is 256/2+50−2*43=92. Thus, instead of an additional 128 points, only an additional 42 points is required.

The time shift relationship of r(t) in the time domain and R(ω) in the frequency domain can be expressed as follows:

$$r(t-t_o) \Longrightarrow e^{-j\omega t_o} R(\omega)$$

where $f = c*(1/T)$, $\omega = c*(2\pi/T)$ and $t_o = T/2$, then $$r(t-T/2) \Longrightarrow e^{-jc(2\pi/T)T/2} R(\omega)$$

$$\Longrightarrow e^{-jc\pi} R(\omega)$$

for even $c$, $e^{-jc\pi} = 1$ for odd $c$, $e^{-jc\pi} = -1$

It will be appreciated that the noise applied to Q(ω) (shown in FIG. 12) and R(ω) is different. However, it can be assumed that Q(ω) and $e^{-j\omega t_o} R(\omega)$ are approximately equal since Q(ω) is essentially a time-offset sample of R(ω).

Referring back to FIG. 12, the even ones of the time-offset frequency coefficients, now referred to as "$A_c$", are multiplied by +1 and the odd ones of the time-offset coefficients $A_c$ are multiplied by −1. For subcarrier frequencies $A_{23}$ through $A_{26}$, for example, the coefficients are represented as the following:

| Non-offset | time-offset |
|---|---|
| $A_{23}$ | $-A_{23}$ |
| $A_{24}$ | $A_{24}$ |
| $A_{25}$ | $-A_{25}$ |
| $A_{26}$ | $A_{26}$ |

It may be recalled that the windowed frequency for a Hanning window is obtained by subtracting for each subcarrier one half the sum of the coefficients at the two adjacent carriers, i.e., $A_c - 1/2(A_{c-1} + A_{c+1})$. Thus, for the carrier sample c=24, the Hanning window provides $A_{24} - 1/2(A_{23} + A_{25})$ for the non-offset coefficient and $A_{24} + 1/2(A_{23} + A_{25})$ for the time-offset coefficient.

For an odd carrier c=25, the Hanning window provides for the non-offset coefficient the Hanning value $A_{25} - 1/2(A_{24} + A_{26})$ and for the time-offset coefficient the Hanning value $-A_{25} - 1/2(A_{24} + A_{26})$. To shift the offset sample points back into alignment with the original sample, the odd carriers C are multiplied by −1. Thus, in this example, the times-offset frequency coefficient becomes $A_{25} + 1/2(A_{24} + A_{26})$ and the resulting Hanning values for each of the sample points are added. The sum is $2A_{24}$ for c=24 and $2A_{25}$ for c=25. Thus, it can be seen that the components of the adjacent signals typically found in each carrier signal after a Hanning window function are removed.

The single-unit dual FFT engine shown in FIG. 12 may be implemented using a dual FFT engine which was designed to complex signals. Rather than setting the imaginary parts of the complex entries to zero, a use which results in redundancy and does not utilize the full bandwidth of the engine, the complex FFT engine can be fully utilized by applying real numbers at both the real and imaginery inputs. This makes use of the fact that the real part of the frequency spectrum of a real signal is an even function and the imaginery part of the frequency spectrum of a real signal is an odd function. The practice of performing dual-real transforms with complex FFTs is well-known and, therefore, will not be described in further detail. Of course, it will be recognized that the dual FFT engine 84 can also be implemented as two separate FFT engines.

Figure 15:
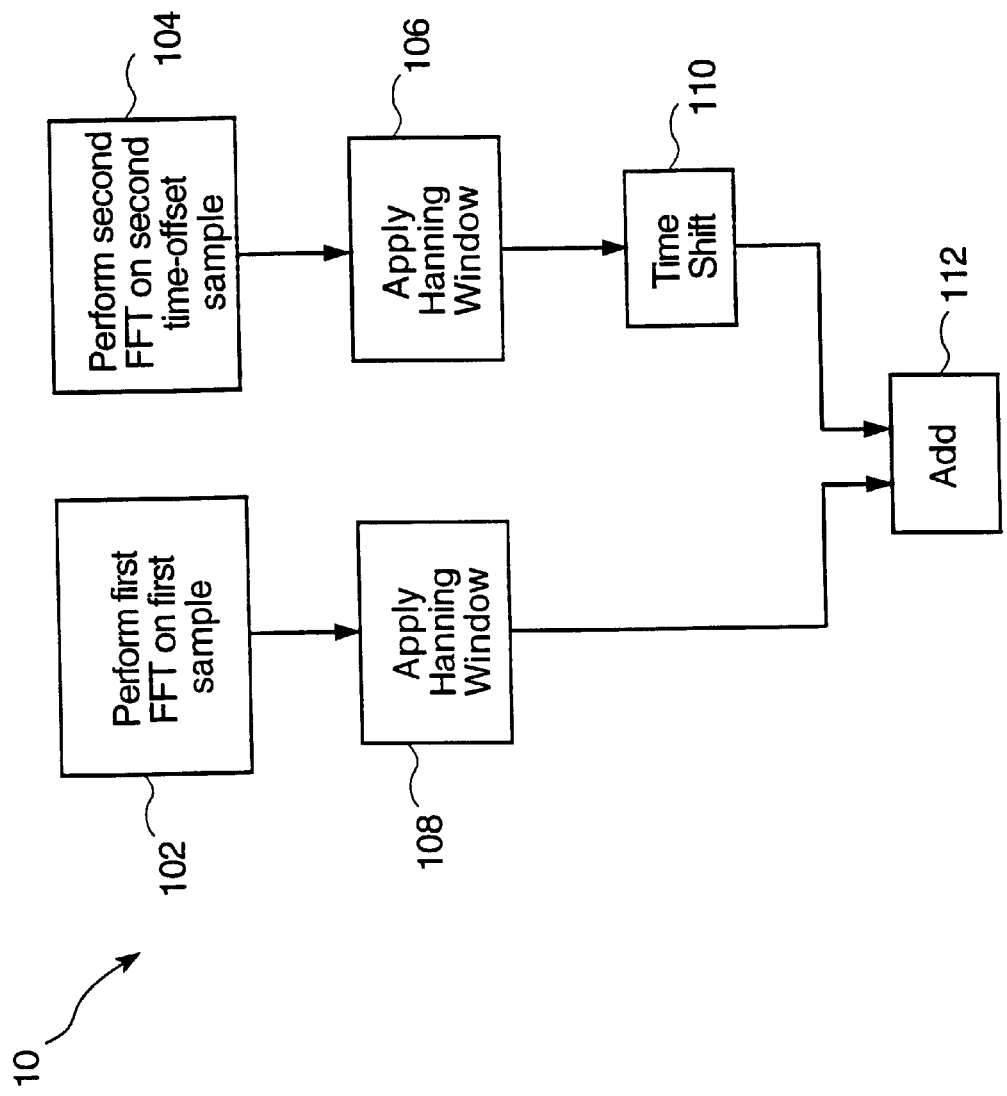
FIG. 15 is a flow diagram of a frequency domain based windowing process performed by the receiver shown in FIG. 12.

Referring now to FIG. 15, a frequency domain windowing process (101) performed by the receiver 80 of FIG. 12 is shown. The process performs (102) a first FFT on a first sample of a temporal symbol waveform sampled at a number (s) of sample points, e.g., s=256 sample points, during the symbol time $T_s$. The process 104 performs a second FFT on a second sample that is time-offset from the first sample by a time=T/2 (i.e., a T/2 prefix to the symbol). The process applies (106) the first Hanning window to the second off-set sample and applies (108) the second Hanning window to the first sample in the frequency domain. The processed T/2 prefix points are shifted (110) in the frequency domain (i.e., the odd ones are multiplied by −1) to realign them with corresponding ones of the first sample points. The process then adds (112) the processed second sample points to the processed first sample points of the OFDM symbol.

Figure 16:
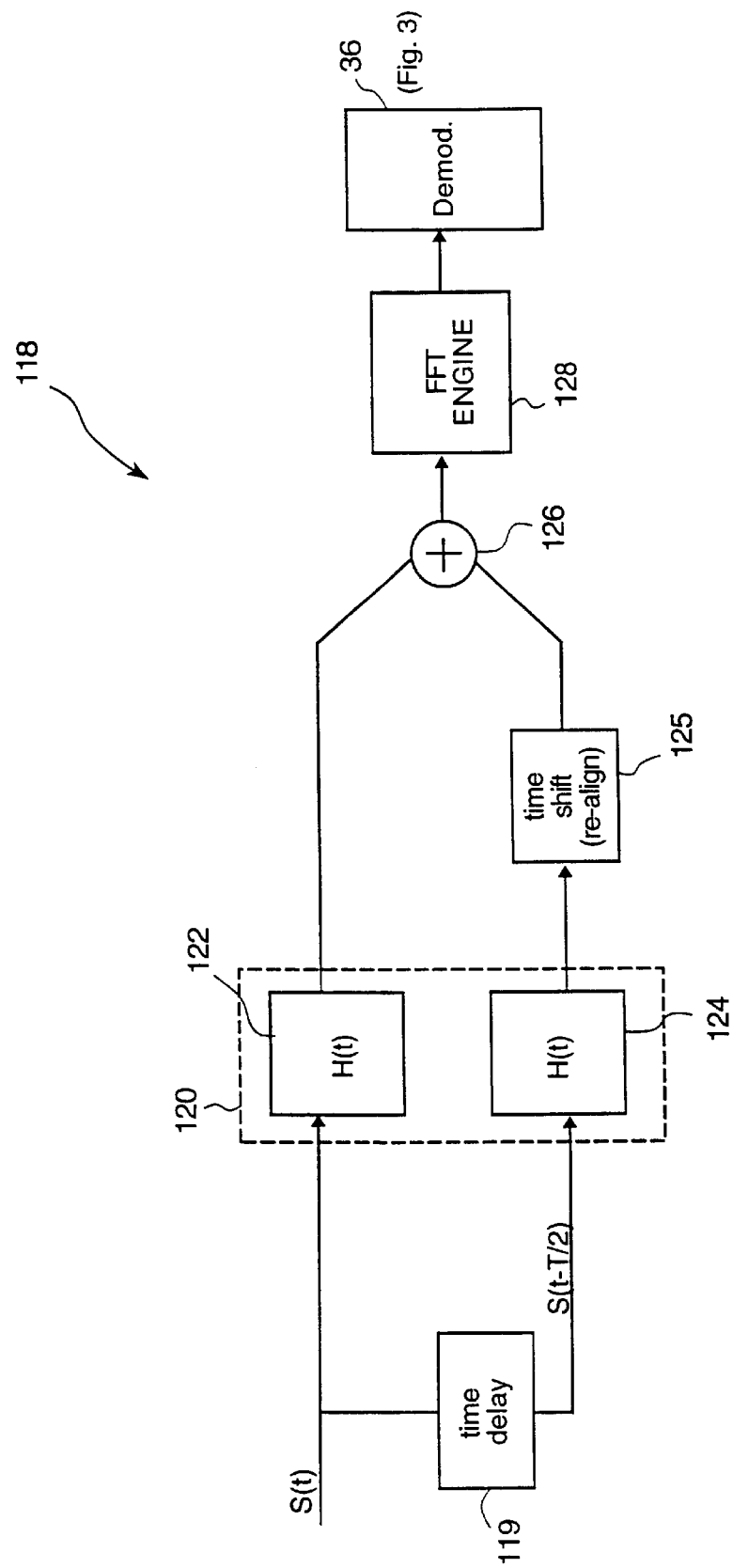
FIG. 16 is alternative embodiment of the OFDM receiver of FIG. 12.

In an alternative embodiment of the receiver 80, the Hanning window filter is placed before the FFT engine. Referring to FIG. 16, a receiver 118 includes a Hanning window filter 120. Again, the window filter may be any apodizing window function having the "symmetric" property as defined above. The Hanning window filter includes a first Hanning window function 122 for receiving a waveform S(t) and a second Hanning window function 124 for receiving a time-offset waveform S(t−T/2) offset by T/2 by time delay element 119. The receiver further includes a time shift element 125 for shifting (e.g., rotating) the windowed time-offset sample points into re-alignment with the windowed, non-offset waveform. Also included is an adder 126 coupled to one output of the Hanning window filter 120 and the time shift element 125, as well as the input of an FFT engine 128.

Figure 17A:
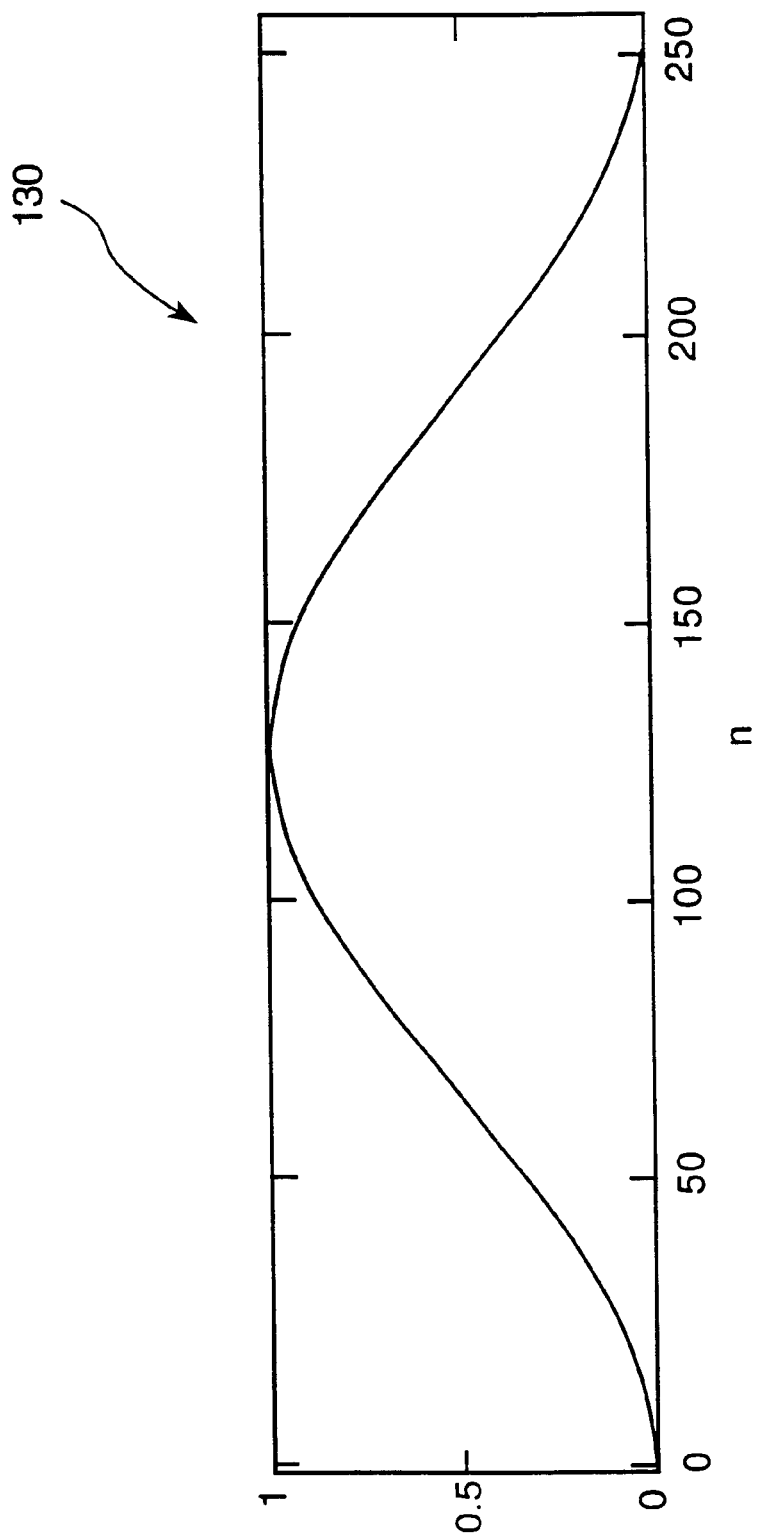
FIGS. 17A–C are depictions of a Hanning window applied to a symbol sample and a time-offset version of the symbol sample in the time domain.
Figure 17B:
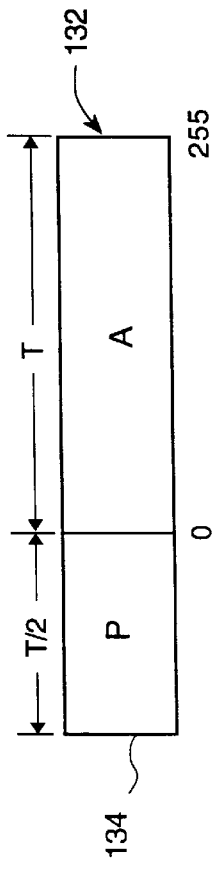
Figure 17C:
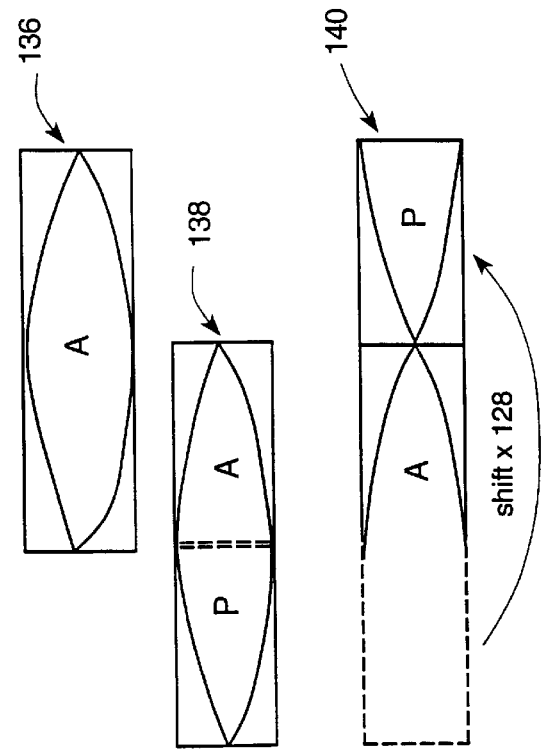

Referring now to FIGS. 17A–C, an example of the time-domain windowing process performed by the receiver 118 of FIG. 16 is shown. FIG. 17A illustrates a time domain shape of Hanning window 130 containing 256 points: $H_0$, $H_1$, $H_2$, $H_3$, ..., $H_{255}$. The Hanning window 130 has the property $H_j = 1 - H_{128+j}$. FIG. 17B depicts an OFDM symbol 132 of a sample size (number of sample points) s=256: $A_0$ to $A_{255}$. The OFDM symbol has a cyclic extension (prefix) 134 $P_j = A_j$, j=128 to 255, in the originally transmitted signal. That is, prefix P is identical to the second half of A. The cyclic prefix P, together with the first half of the symbol A, thus represent a time-offset or delayed version of sample A. The time-offset sample is offset by T/2 (128 points, in this example). FIG. 17C shows a first Hanning window applied to sample A, that is, $(A_0 - A_{255})*(H_0 - H_{255})$, to give Hanning values $X_0 - X_{255}$, collectively, windowed sample X 136. Further illustrated is a second Hanning window applied to the points $(P_{128} - A_{127})*(H_0 - H_{255})$ to give Hanning values $(Y_0 - Y_{255})$, collectively, windowed sample Y 138. Therefore, with reference to FIG. 17C, $X_j = A_j * H_j$, and for j=0 to 255, $Y_j = P_{j+128} * H_j$ and $Y_{j+128} = A_j * H_{j+128}$.

Referring again to FIG. 17C, to re-align the two windowed samples $X_j$ and $Y_j$, $Y_{j+128}$, sample P is moved 128 points (as indicated by the arrow) to align with sample A. Thus, after the shift, $Y_0 - Y_{255}$ is $Y_{128}$, $Y_{129}$, ... $Y_{255}$, $Y_0$, $Y_1$, ... $Y_{126}$, $Y_{127}$, collectively, Y 140. Combining the two samples X 136 and Y 140 gives $X_0 + Y_{128}$, $X_1 + Y_{129}$, ... $X_{127} + Y_{255}$, $X_{128} + Y_0$, $X_{129} + Y_1$, ... $X_{254} + Y_{126}$, $X_{265} + Y_{127}$.

More specifically, for the first 128 points of the combined windowed samples (j=0 to 127):

$$X_j + Y_{j+128} = A_j * H_j + A_j * H_{j+128}$$
$$= A_j * [H_j + H_{j+128}]$$
$$= A_j * [H_j + 1 - H_j]$$
$$= A_j$$

For the second 128 points of the combined windowed samples X and Y (where j=0 to 127):

$$X_{j+128} + Y_j = A_{j+128} * H_{j+128} + P_{j+128} * H_j$$
$$= A_{j+128} * H_{j+128} + P_{j+128} * [1 - H_{j+128}]$$
$$\sim A_{j+128} * H_{j+128} + A_{j+128} * [1 - H_{j+128}]$$
$$\sim A_{j+128} * H_{j+128} + [1 - H_{j+128}]$$
$$\sim A_{j+128}$$

It should be noted that, because A and P are different signals and therefore noise and channel distortion are applied to each differently, there is actually a small but negligible difference between the two. Thus, $A_{j+128}$ is approximately equal to $P_{j+128}$ in the substitution above.

It will be recognized that, although a full Hanning window can be applied to both the original and the offset samples (as described above), the summing of the resultant Hanning values in samples X 136 and Y 140 for the 128 points of A which are common to both samples yields no more than the original sample $A_j$. Therefore, the same results could be achieved by applying a first half Hanning window ($H_0$ to $H_{127}$) to P and a second half Hanning window ($H_{128}$ to $H_{255}$) to the second half of A. The half Hanning window approach is less computationally intensive than the full Hanning window approach and is therefore a more desirable implementation.

Figure 18:
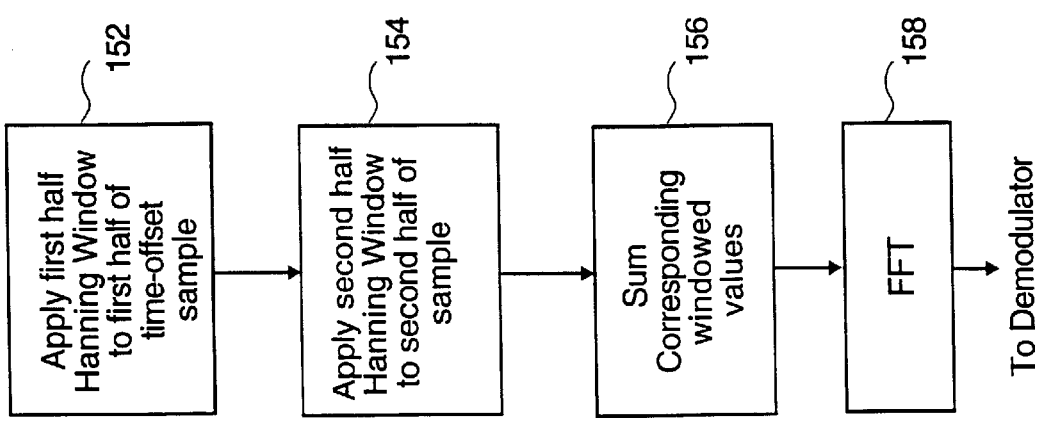
FIG. 18 is a time-domain based windowing process performed by the receiver shown in FIG. 16.

Referring to FIG. 18, a time-domain based windowing process (140) performed by the receiver 118 shown in FIG. 16 (and depicted in the example of FIGS. 16B–C) is shown. The process applies (152) a first half of a Hanning window to the first half (e.g., points 0 to 127 in a 256 point sample) of a T/2 time-offset sample and applies (154) a second half of a Hanning window to the second half (e.g., points 128 to 256 in a 256 point sample) of a first, non-offset sample. The windowed values in the first sample are added (156) to corresponding windowed values in the second sample (i.e., values separated by T are added together). The summed values, along with the points in the first half of the first sample, are then Fourier-transformed (158) by a single FFT engine.

Thus, the Hanning window effectively limits the effect of a non-orthogonal narrowband interferer by tapering the endpoints of the signal smoothly to zero. Since the original signal is also distorted by the window, the realignment and combination of the signals restores the original signal without changing the benefit gain (reduction in effects of narrowband interferer) achieved by applying the window.

It will be appreciated by those skilled in the art that the windowing function may be selected as any "symmetric" apodizing window function, that is, an apodizing window function which has the property $W_j + W_{(FFTSize/2+j)}$=constant, where FFTSize is the size of the FFT sample. As noted above, the Hanning window has this property. Another example of such a symmetric apodizing window function would be a triangular-shaped window.

Other Embodiments

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A method of processing an OFDM symbol, the method comprising:

performing a windowing function on a symbol sample having a symbol period of T and a time-offset symbol sample offset from the symbol by T/2 to produce first windowed values for the symbol and second windowed values for the time-offset symbol, the windowing function being a symmetric apodizing window function;

applying a time shift to re-align the time-offset symbol sample with the symbol sample, thereby re-aligning the second windowed values with corresponding first windowed values; and summing the second windowed values with the corresponding first windowed values.

2. The method of claim 1, wherein performing a windowing function occurs in the time domain and includes applying the windowing function to the symbol sample and the time-offset symbol sample in the time domain.

3. The method of claim 2, wherein performing a windowing function includes applying a first half of the windowing function to a first half of the time-offset symbol sample and applying a second half of the windowing function to a second half of the symbol sample.

4. The method of claim 1, wherein performing a windowing function occurs in the frequency domain and includes applying the windowing function to FFT frequency coefficients of the symbol sample and the time-offset symbol sample.

5. The method claim 2, wherein the symmetric apodizing window function is a Hanning window.

6. The method of claim 4, wherein the symmetric apodizing window function is a Hanning window.

7. The method of claim 4, further comprising:

transforming the symbol sample corresponding to a symbol period T from a time-domain to a frequency domain;

transforming the symbol sample time-offset by T/2 from a time-domain to a frequency domain;

applying the symmetric apodizing window function to the transformed symbol sample to produce the first windowed values; and applying the symmetric apodizing window function to the transformed time-offset symbol sample to produce the second windowed values.

8. The method of claim 2, wherein performing the windowing function further comprises:

applying a half symmetric apodizing window function to a second half of the symbol sample corresponding to a symbol period T to produce the first windowed values; and applying a half symmetric apodizing window function to a first half of the time-offset symbol sample to produce the second windowed values.

9. The method of claim 8, further comprising:

providing the summed windowed values and a first half of the symbol sample to a Fast Fourier transform.

10. A receiver for processing symbols transmitted over a transmission channel, the receiver comprising:

a window filter for applying an apodizing window to a first symbol sample of a symbol having a symbol period T and a second symbol sample corresponding to the first symbol sample offset by T/2 to produce first windowed values for the first symbol sample and second windowed values for the second symbol sample, the apodizing window being a symmetric apodizing window;

a time shifting element for time-shifting the second windowed values into alignment with the first windowed values; and an adder for adding the second window values to the corresponding first windowed values.

11. The receiver of claim 10, wherein the window filter applies the symmetric apodizing window to the first and second symbol samples in the time domain.

12. The receiver of claim 11, wherein the window filter applies a first half of the apodizing window to a first half of the time-offset symbol sample and a second half of the apodizing window to a second half of the symbol sample.

13. The receiver of claim 10, wherein the window filter applies the apodizing window to FFT frequency coefficients of the symbol sample and the time-offset symbol sample in the frequency domain.

14. The receiver of claim 11, wherein the symmetric apodizing window is a Hanning window.

15. The receiver of claim 13, wherein the symmetric apodizing window is a Hanning window.

16. The receiver of claim 13, further comprising:

an FFT engine to transform the first and second symbol samples to a frequency domain;

wherein the window filter applies the apodizing window to the transformed first symbol sample to produce the first windowed values; and wherein the window filter applies the apodizing window to the transformed second symbol sample to produce the second windowed values.

17. The receiver of claim 11, wherein the window filter applies a half symmetric apodizing window to a second half of the first symbol sample to produce the first windowed values and a half symmetric apodizing window to a first half of the second symbol sample to produce second windowed values.

18. The receiver of claim 17, wherein the adder outputs the summed window values and a first half of the first symbol sample to a Fast Fourier Transform engine.

* * * * *

UNITED STATES PATENT AND TRADEMARK OFFICE
CERTIFICATE OF CORRECTION

Page 1 of 1

PATENT NO.   : 6,269,132 B1
DATED        : July 31, 2001
INVENTOR(S)  : Lawrence W. Yonge III It is certified that error appears in the above-identified patent and that said Letters Patent is hereby corrected as shown below:

<u>Title page,</u>
Item [56], References Cited, OTHER PUBLICATIONS, the "Kapoor et al." reference, "Interfrence" should be -- Interference --.

<u>Column 9,</u>
Line 38, "FIGS. 16B-C" should be -- FIGS. 17B-C --.

Signed and Sealed this

Sixteenth Day of April, 2002

Attest:

JAMES E. ROGAN
*Director of the United States Patent and Trademark Office*

*Attesting Officer*